Figures 1, 2:
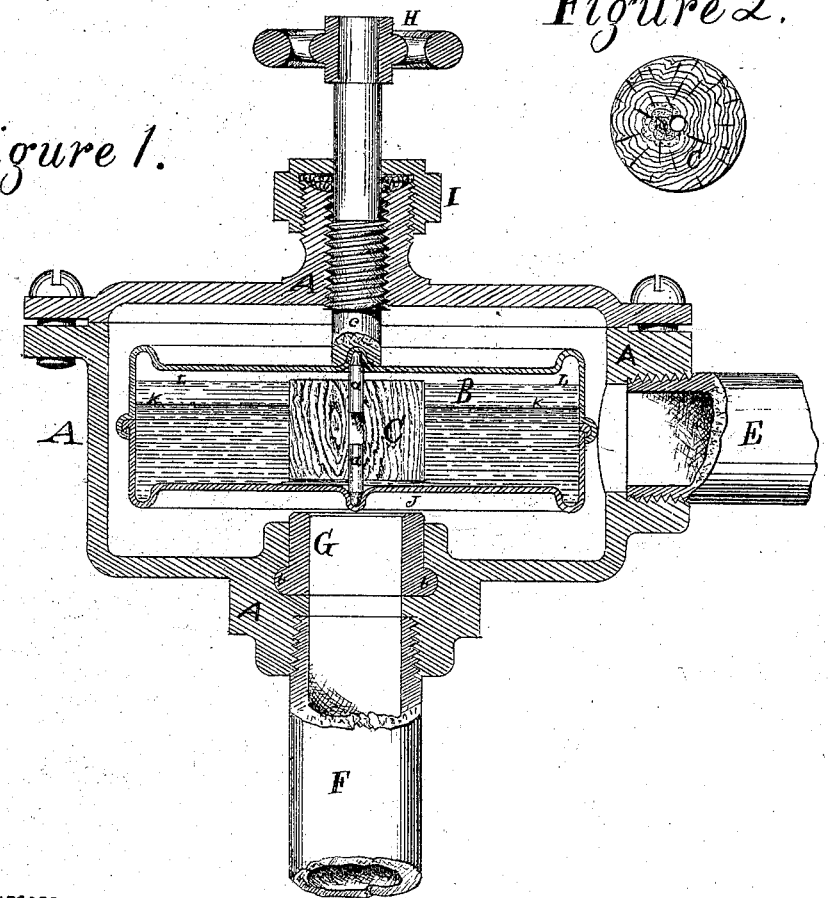

H. S. MAXIM & L. P. HAWES.
Steam-Traps.

No. 141,063. Patented July 22, 1873.

UNITED STATES PATENT OFFICE.

HIRAM S. MAXIM AND LORING P. HAWES, OF BROOKLYN, NEW YORK.

IMPROVEMENT IN STEAM-TRAPS.

Specification forming part of Letters Patent No. 141,063, dated July 22, 1873; application filed March 14, 1873.

*To all whom it may concern:*

Be it known that we, HIRAM S. MAXIM and LORING P. HAWES, both of Brooklyn, in the county of Kings and State of New York, have invented certain Improvements in Steam-Traps, of which the following is a specification:

The object of this invention is to allow the water of condensation to escape from a steam heating-coil or similar apparatus and to shut the valve when the water has blown out. This we effect by means of an expansion-vessel containing alcohol or other easily-evaporated liquid—that is, expanded by the contact of the steam heat, and closes the valve and stops the escape until the apparatus cools sufficiently for the expansive vessel to contract and open the valve.

Figure 1 in the accompanying drawing shows a vertical section of a trap embodying our invention. Fig. 2 is a plan of the wooden inside support.

A A is an outer shell, and should be of sufficient strength to resist an internal pressure of one hundred pounds to the square inch. It is formed of two pieces, which are held together by suitable screws, which can be removed to repair or clean the inside of the trap. B is the expansive vessel, made of thin sheet metal in a flattened form, kept in its position by the outer shell A A, and adjusted by the stem $c$ and wheel H. This vessel contains alcohol or other easily-evaporized liquid combined with or standing on any thick gummy substance like resin, said gum filling the vessel above the central point, and thus preventing any waste of alcohol at this point.

When the steam strikes said vessel the expansion of the liquid or the formation of vapor is sufficient to press out or expand its elastic top and bottom, and stop the flow of steam by bringing one of its sides against the opening G, from whence the steam escapes. When the accumulation of water of condensation allows the parts to cool sufficiently for the vessel B to collapse or lessen in thickness by the diminished pressure within it, the side of the vessel which has formed the valve is drawn away from the steam-inlet, and the water is allowed to run out until the heat is sufficient to expand or boil the alcohol and produce a pressure in the vessel B, which again springs out its sides and thus closes the valve, as before.

C is a cylindrical block of wood, and is secured in its place by the two pins $a\ a$, which are soldered to the sides of the vessel B, but are loose in the wood. Said block is of a length sufficient to prevent the sides of the vessel being injured by collapsing by the external pressure, or from the face of the stem C being secured down upon it. E is the outlet-pipe. F is the inlet-pipe. G is the inlet valve or opening, and is composed of soft metal, being secured in its place by the concentric ring $b\ b$. H is a hand-wheel for turning the spindle or stem $c$. I is a stuffing-nut. K K shows the top of the gum, and L L the top of the alcohol.

This trap may be employed to advantage to remove the water from steam-engine cylinders. By a proper adjustment of the screw-spindle $c$ water of any temperature from 100° Fahrenheit to 212° Fahrenheit may be retained or discharged, as desired. A certain temperature produces a certain pressure in vessel B, to which is due a corresponding expansion of said vessel; so, if the screw-spindle is so adjusted that it requires 200° Fahrenheit to close the valve, the trap will continue to discharge water as fast as it accumulates at that temperature; if the water becomes hotter the valve closes, while if it cools the valve opens. The many advantages of his feature are obvious.

This trap will operate equally well either side up.

What we claim as our invention is—

1. The combination of the expansive vessel B, adjusting-spindle $c$, and stuffing-nut I, operating in connection with the steam-inlet G, substantially as and for the purpose hereinbefore set forth.

2. The wooden support C introduced within the expansion-vessel B and held in position by the pins $a$, in combination with the inclosing-case and valve-seat, substantially as and for the purposes set forth.

3. The expansion-vessel B of a steam-trap, containing alcohol above a layer of resinous material, for preventing the escape of alcohol or the vapors thereof at the joint in the metal, substantially as set forth.

HIRAM S. MAXIM.
L. P. HAWES.

Witnesses:
A. T. WELCH,
HENRY B. ADAMS.